United States Patent
Fornage et al.

(10) Patent No.: US 9,948,204 B2
(45) Date of Patent: Apr. 17, 2018

(54) METHOD AND APPARATUS FOR CONTROLLING RESONANT CONVERTER OUTPUT POWER

(75) Inventors: Martin Fornage, Petaluma, CA (US); Donald Richard Zimmanck, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 149 days.

(21) Appl. No.: 13/475,460

(22) Filed: May 18, 2012

(65) Prior Publication Data

US 2012/0294045 A1 Nov. 22, 2012

Related U.S. Application Data (60) Provisional application No. 61/519,242, filed on May 19, 2011.

(51) Int. Cl.
*H02M 3/335* (2006.01)
*H02M 7/217* (2006.01)
*H02J 1/00* (2006.01)

(52) U.S. Cl.
CPC .......... *H02M 7/217* (2013.01); *H02J 1/00* (2013.01); *Y02B 70/1441* (2013.01)

(58) Field of Classification Search
CPC .................................................. H02M 7/217
USPC .... 363/16, 17, 21.02, 21.03, 56.02, 98, 131, 363/132
See application file for complete search history.

(56) References Cited

U.S. PATENT DOCUMENTS

| | | | |
|---|---|---|---|
| 4,012,682 A | 3/1977 | Carroll et al. | |
| 4,363,243 A | 12/1982 | Poff | |
| 4,417,477 A | 11/1983 | Poff | |
| 4,459,532 A | 7/1984 | Schutten et al. | |
| 4,459,535 A | 7/1984 | Schutten et al. | |
| 4,469,999 A | 9/1984 | Swenson | |
| 4,706,175 A | 11/1987 | Schutten et al. | |
| 4,706,183 A | 11/1987 | Schutten et al. | |
| 5,652,503 A | 7/1997 | Urban et al. | |
| 6,344,979 B1 * | 2/2002 | Huang et al. | 363/16 |
| 6,351,401 B1 | 2/2002 | Scheel et al. | |
| 7,050,312 B2 | 5/2006 | Tracy et al. | |

(Continued)

FOREIGN PATENT DOCUMENTS

| | | |
|---|---|---|
| CN | 1405936 A | 3/2003 |
| CN | 101826796 A | 9/2010 |

(Continued)

OTHER PUBLICATIONS

International Search Report and Written Opinion dated Aug. 2, 2012 for PCT Application No. PCT/US2012/038756, 6 pgs.

(Continued)

*Primary Examiner* — Adolf Berhane
*Assistant Examiner* — Afework Demisse
(74) *Attorney, Agent, or Firm* — Moser Taboada (57) ABSTRACT

A method and apparatus for controlling power conversion. In one embodiment, the method comprises computing a voltage ratio based on a voltage conversion in a resonant converter; comparing the voltage ratio to a threshold; and controlling, independent of switching frequency of the resonant converter, power output from the resonant converter based on whether the voltage ratio satisfies the threshold.

18 Claims, 4 Drawing Sheets

(56) References Cited

U.S. PATENT DOCUMENTS

| | | |
|---|---|---|
| 7,088,601 B2 | 8/2006 | Tracy et al. |
| 7,113,405 B2 | 9/2006 | Armstrong et al. |
| 7,405,494 B2 | 7/2008 | Tassitino, Jr. et al. |
| 7,508,094 B2 | 3/2009 | Johnson, Jr. et al. |
| 7,561,451 B2 | 7/2009 | Tracy et al. |
| 7,583,109 B2 | 9/2009 | Oughton, Jr. et al. |
| 7,684,222 B2 | 3/2010 | Paatero |
| 7,800,924 B2 | 9/2010 | Oughton, Jr. et al. |
| 7,948,778 B2 | 5/2011 | Pfitzer et al. |
| 8,085,556 B2 * | 12/2011 | Moussaoui ....... H02M 3/33507 363/17 |
| 8,587,975 B2 * | 11/2013 | Jain ................. H02M 3/33584 363/17 |
| 8,614,901 B2 * | 12/2013 | Victor ................... H02M 3/158 323/299 |
| 2002/0101746 A1 * | 8/2002 | Loef ................... H02M 1/4258 363/71 |
| 2008/0130336 A1 | 6/2008 | Taguchi |
| 2008/0239775 A1 | 10/2008 | Oughton et al. |
| 2008/0259646 A1 | 10/2008 | Moussaoui |
| 2008/0265681 A1 | 10/2008 | Pfitzer et al. |
| 2009/0196074 A1 | 8/2009 | Choi |
| 2009/0323380 A1 | 12/2009 | Harrison |
| 2010/0014322 A1 | 1/2010 | Harrison |
| 2010/0290174 A1 | 11/2010 | Harrison |
| 2011/0181128 A1 | 7/2011 | Perreault et al. |
| 2011/0261593 A1 * | 10/2011 | Pan ....................... H02M 3/337 363/21.02 |
| 2011/0278932 A1 | 11/2011 | Navarro et al. |
| 2012/0038434 A1 | 2/2012 | Harrison |
| 2012/0068541 A1 | 3/2012 | Anderson |
| 2012/0074786 A1 | 3/2012 | Johnson, Jr. et al. |
| 2012/0076287 A1 * | 3/2012 | Ramalingam ............ H04B 3/23 379/202.01 |
| 2012/0081200 A1 * | 4/2012 | Silva ................................ 336/20 |
| 2012/0086536 A1 | 4/2012 | Harrison |
| 2012/0092913 A1 | 4/2012 | Harrison |
| 2012/0139514 A1 | 6/2012 | Paatero |
| 2012/0153995 A1 | 6/2012 | Oughton, Jr. et al. |

FOREIGN PATENT DOCUMENTS

| | | |
|---|---|---|
| EP | 1744140 A2 | 1/2007 |
| EP | 1973220 A1 | 9/2008 |
| EP | 2079140 A1 | 7/2009 |
| GB | 235951 A | 6/1925 |
| GB | 2359151 A | 8/2001 |
| JP | 2002281754 A | 9/2002 |
| JP | 2010148227 A | 7/2010 |
| JP | 2011072137 A | 4/2011 |
| SU | 1628163 A1 | 2/1991 |
| WO | 2001065659 A2 | 9/2001 |
| WO | 2006043837 A2 | 4/2006 |
| WO | 2008026938 A2 | 3/2008 |
| WO | 2010055282 A1 | 5/2010 |
| WO | 2011062508 A2 | 5/2011 |
| WO | 2011102910 A1 | 8/2011 |
| WO | 2012002824 A2 | 1/2012 |
| WO | 2012002825 A2 | 1/2012 |
| WO | 2012005604 A2 | 1/2012 |
| WO | WO2012045666 * | 4/2012 ............... H02H 7/12 |
| WO | 2012062375 A1 | 5/2012 |
| WO | 2012081998 A2 | 6/2012 |

OTHER PUBLICATIONS

European Patent Office Substantive Search Report, Application No. 12785250.7-1809 / 2710442 PCT/US2012038756, 6 Pages, dated Feb. 2, 2015.

* cited by examiner

METHOD AND APPARATUS FOR CONTROLLING RESONANT CONVERTER OUTPUT POWER

CROSS-REFERENCE TO RELATED APPLICATIONS

This application claims benefit of U.S. provisional patent application Ser. No. 61/519,242, filed May 19, 2011, which is herein incorporated in its entirety by reference.

BACKGROUND OF THE INVENTION

Field of the Invention

Embodiments of the present disclosure relate generally to power conversion, and, in particular, to controlling power conversion in a resonant converter.

Description of the Related Art

Resonant converters provide many advantages over other types of power converters. Such advantages may include low noise, low component stress, low component count, and predictable conduction-dominated losses. Resonant converters may therefore be smaller, less costly, and more efficient devices than other types of converters.

In some resonant converters, a full H-bridge converts a DC input voltage to a square wave voltage as an input to a resonant tank. Generally, the H-bridge is operated at or proximate the resonant frequency of the tank. However, changes in available input voltage and/or output voltage requirements for the converter may require that the H-bridge operating frequency be shifted away from the resonant frequency to control the converter's output power flow. As the operating frequency increases, switching losses for the H-bridge switches increase and reduce the efficiency of the converter.

Therefore, there is a need in the art for a method and apparatus for efficiently controlling the output power of a resonant converter.

SUMMARY OF THE INVENTION

Embodiments of the present invention generally relate to a method and apparatus for controlling power conversion. In one embodiment, the method comprises computing a voltage ratio based on a voltage conversion in a resonant converter; comparing the voltage ratio to a threshold; and controlling, independent of switching frequency of the resonant converter, power output from the resonant converter based on whether the voltage ratio satisfies the threshold.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
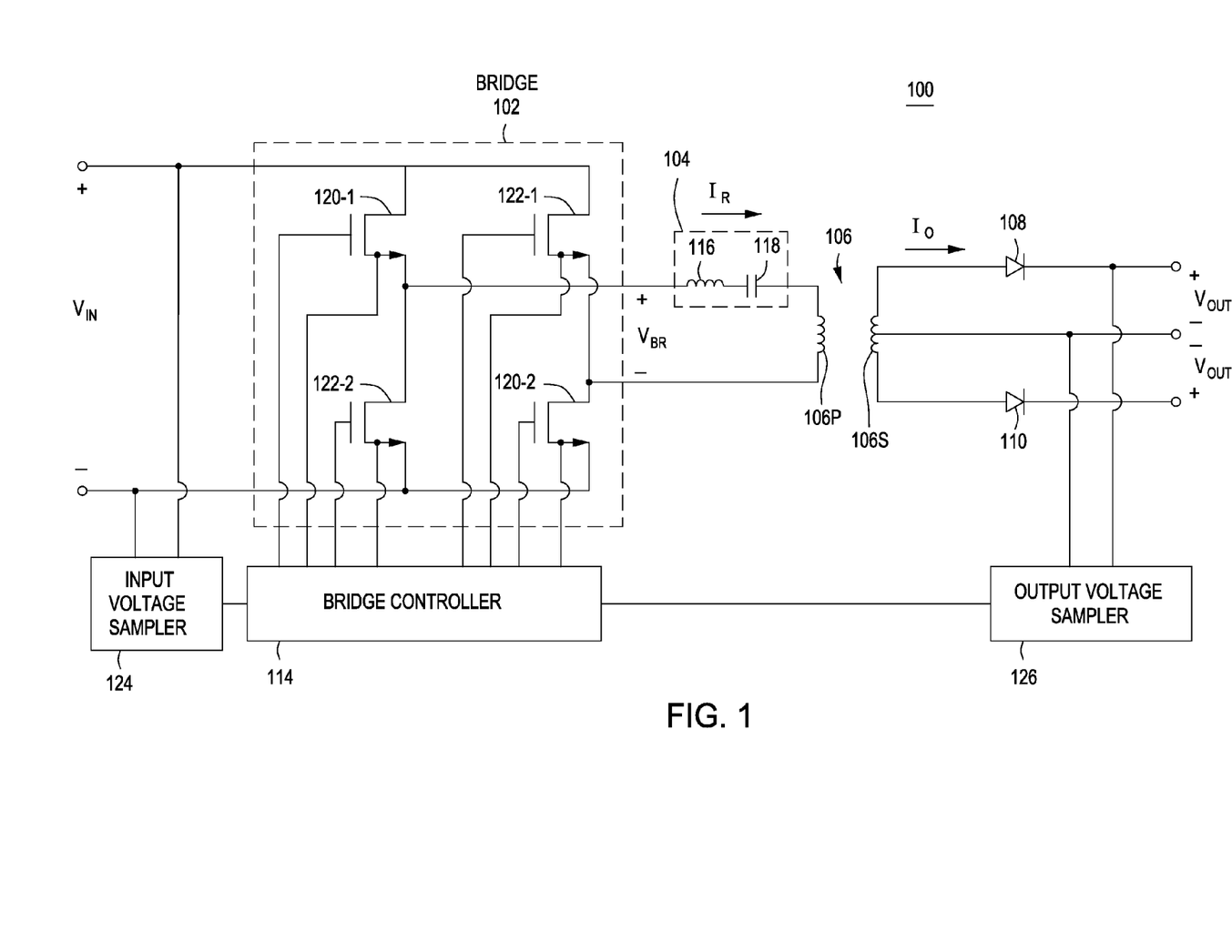
FIG. 1 is a block diagram of a resonant converter in accordance with one or more embodiments of the present invention.

FIG. 1 is a block diagram of a resonant converter 100 in accordance with one or more embodiments of the present invention. This diagram only portrays one variation of the myriad of possible system configurations. The present invention can function in a variety of power generation environments and systems.

The resonant converter 100 is a DC-DC converter that comprises a bridge 102 coupled across a series combination of an inductor 116, a capacitor 118, and a primary winding 106$p$ of a transformer 106. The bridge 102 is a full H-bridge comprising switches 120-1, 120-2, 122-1, and 122-2 (e.g., n-type metal-oxide-semiconductor field-effect transistors, or MOSFETs) arranged such that switches 120-1/120-2 and 122-1/122-2 form first and second diagonals, respectively, of the H-bridge. Gate terminals and source terminals of each of the switches 120-1, 120-2, 122-1, and 122-2 are coupled to a bridge controller 114 for operatively controlling the switches. In other embodiments, the switches 120-1, 120-2, 122-1, and 122-2 may be any other suitable electronic switch, such as insulated gate bipolar transistors (IGBTs), bipolar junction transistors (BJTs), p-type MOSFETs, gate turnoff thyristors (GTOs), and the like.

A first output terminal of the bridge 102 is coupled between the switches 120-1 and 122-2, and is also coupled to a first terminal of the inductor 116. A second terminal of the inductor 116 is coupled to a first terminal of the capacitor 118, and a second terminal of the capacitor 118 is coupled to a first terminal of the primary winding 106P. The inductor 116 and the capacitor 118 form a series resonant circuit 104 having a resonant frequency at or close to 100 kilohertz (kHz); for example, the inductor 116 may be a 5 microhenry (uH) inductor and the capacitor 118 may be a 500 nanofarad (nF) capacitor. In other embodiments, the resonant circuit 104 may have a different resonant frequency. In some alternative embodiments, the inductor 116 may represent a leakage inductance of the transformer 106 rather than being a separate inductor, thereby reducing the overall component count of the resonant converter 100. In other alternative embodiments, other types of resonant circuits (e.g., series LC, parallel LC, series-parallel LLC, series-parallel LCC, series-parallel LLCC, and the like) may be utilized within the resonant converter 100.

A second terminal of the primary winding 106$p$ is coupled to a second output terminal of the bridge 102, where the second output terminal is coupled between the switches 122-1 and 120-2. Additionally, an input voltage sampler 124 is coupled across the input to the bridge 102 and to the bridge controller 114.

The bridge 102 generally operates at a switching frequency of 100 kilohertz (kHz)—i.e., the resonant frequency of the resonant circuit 104—and is able to switch, for example, from 60 to 600 volts depending upon the DC voltage source to the bridge. In other embodiments, the bridge 102 may operate at a different switching frequency.

On the secondary side of the transformer 106, a first terminal of a secondary winding 106s is coupled to an anode terminal of a diode 108. A cathode terminal of the diode 108 is coupled to a first output terminal of the resonant converter 100. A center tap is coupled to the secondary winding 106s and acts as a second output terminal of the resonant converter 100. A second terminal of the secondary winding 106s is coupled to an anode terminal of a diode 110. A cathode terminal of the diode 110 is coupled to a third output terminal of the resonant converter 100. An output voltage sampler 126 is coupled to the cathode terminal of the diode 108, the center tap, and the bridge controller 114. In some embodiments, an AC switching stage (not shown) may be coupled to the output terminals of the resonant converter 100 for converting the generated DC current to an AC output.

During operation, the bridge 102 receives an input voltage Vin from a DC voltage source, such as one or more renewable energy sources (e.g., photovoltaic (PV) modules, wind farms, hydroelectric systems, or the like), batteries, or any suitable source of DC power. The bridge controller 114 alternately activates/deactivates the H-bridge diagonals (i.e., 180° out of phase) at a frequency of 100 kHz to generate a bridge output voltage Vbr that is a bipolar square wave. The bridge output voltage Vbr results in a current Ir through the resonant circuit 104 and the primary winding 106p, thereby inducing an alternating current in the secondary winding 106s. The transformer 106 may be a step-up transformer for increasing the voltage from the primary to the secondary (for example, for a DC input generated by a PV module, the transformer 106 would generally be a step-up transformer) or, alternatively, a step-down transformer for decreasing the voltage. The type of transformer depends on the application for the power converter; for example, for a renewable application where the DC input is generated by one photovoltaic (PV) module and the output is an AC mains (grid) type voltage, a typical turns ratio would be 1:6.

The secondary winding 106s generates an approximately sinusoidal current waveform Io at the frequency of 100 kHz, which is then rectified by the diodes 108 and 110 to generate an output voltage +Vout between the first and second output terminals of the resonant converter 100, respectively, and an output voltage −Vout between the second and third output terminals of the resonant converter 100, respectively. The amplitude of the current waveform Io, and hence the output power generated by the resonant converter 100, is determined by the switching frequency of the bridge 102 and can be increased or decreased by suitably adjusting the switching frequency of the H-bridge; i.e., the current (and power) transferred to the output terminals (Vout) varies as the signal frequency moves away from the resonant frequency of the resonant circuit 104.

The bridge controller 114 operates the switches 120-1, 120-2, 122-1, and 122-2 such that a desired output power is generated by the resonant converter 100. In some embodiments where the resonant converter 100 receives input power from a PV module, the bridge controller 114 may operate the H-bridge switches such that the PV module is biased at a maximum power point (MPP).

The input voltage sampler 124 samples the input voltage Vin and generates values indicative of the sampled input voltage ("input voltage samples"), while the output voltage sampler 126 samples the output voltage Vout and generates values indicative of the sampled output voltage ("output voltage samples"). In some embodiments, the input voltage sampler 124 and the output voltage sampler 126 may perform such sampling at rates of 1 kHz and 50 kHz, respectively. In some embodiments, the input voltage sampler 124 and the output voltage sampler 126 each comprise an analog-to-digital converter (ADC) for generating the samples in a digital format.

The input voltage sampler 124 and the output voltage sampler 126 respectively couple the input and output voltage samples to the bridge controller 114. In accordance with one or more embodiments of the present invention, the bridge controller 114 computes the ratio of the input voltage to the output voltage (i.e., Vin/Vout) and compares the computed voltage ratio to a threshold. In some embodiments, this could be done at the same sample rate as the output voltage sampler 126 (e.g., 50 kHz). If the voltage ratio exceeds the threshold, the bridge controller 114 effectively operates the bridge 102 as a half H-bridge by, for example, deactivating switch 122-1, activating the switch 120-2, and alternately operating the switches 120-1 and 122-2 based on the current switching frequency. Alternatively, to achieve the half H-bridge operation, the bridge controller 114 may suitably activate/deactivate other combinations of switches within the bridge 102. By operating the bridge 102 as a half H-bridge, the peak-to-peak output voltage from the bridge 102 is reduced from 2Vin to Vin without requiring changes to the operating frequency of the bridge 102. If the computed voltage ratio falls below the threshold, the bridge controller 114 operates the bridge 102 as a full H-bridge as previously described. By switching between half H-bridge and full H-bridge operation of the bridge 102, the output power of the resonant converter 100 can be effectively controlled while minimizing switch losses within the bridge 102. In certain embodiments, the threshold may be such that Vout=0.6*Vin*(N2/N1), where N1 and N2 are the number of turns of 106p and 106s, respectively.

In some embodiments, the capacitor 118 may be charged or discharged in a controlled manner in order to reduce transient effects when switching the H-bridge 102 between full H-bridge and half H-bridge operation; this may be done by modulating the duty cycle of the bridge (effectively modulating the DC bias voltage) in order to dampen the transient oscillation of bias voltage. For example, during full H-bridge operation, the capacitor 118 may have an average quasi-zero value, and the capacitor 118 may then be charged in a controlled manner to a value of Vin when the bridge operation is switched to half H-bridge operation. Such control may be done during the transition between full H-bridge and half H-bridge operation; additionally and/or alternatively, the pulse widths may be modulated prior to and/or after the actual mode change.

In one or more alternative embodiments, the resonant converter 100 may interleave two or more power stages and/or switch among a plurality of modes of operation. Energy generated by the resonant converter 100 may be used by one or more appliances and/or may be stored for later use, for example, utilizing batteries, heated water, hydro pumping, $H_2O$-to-hydrogen conversion, or the like.

Figure 2:
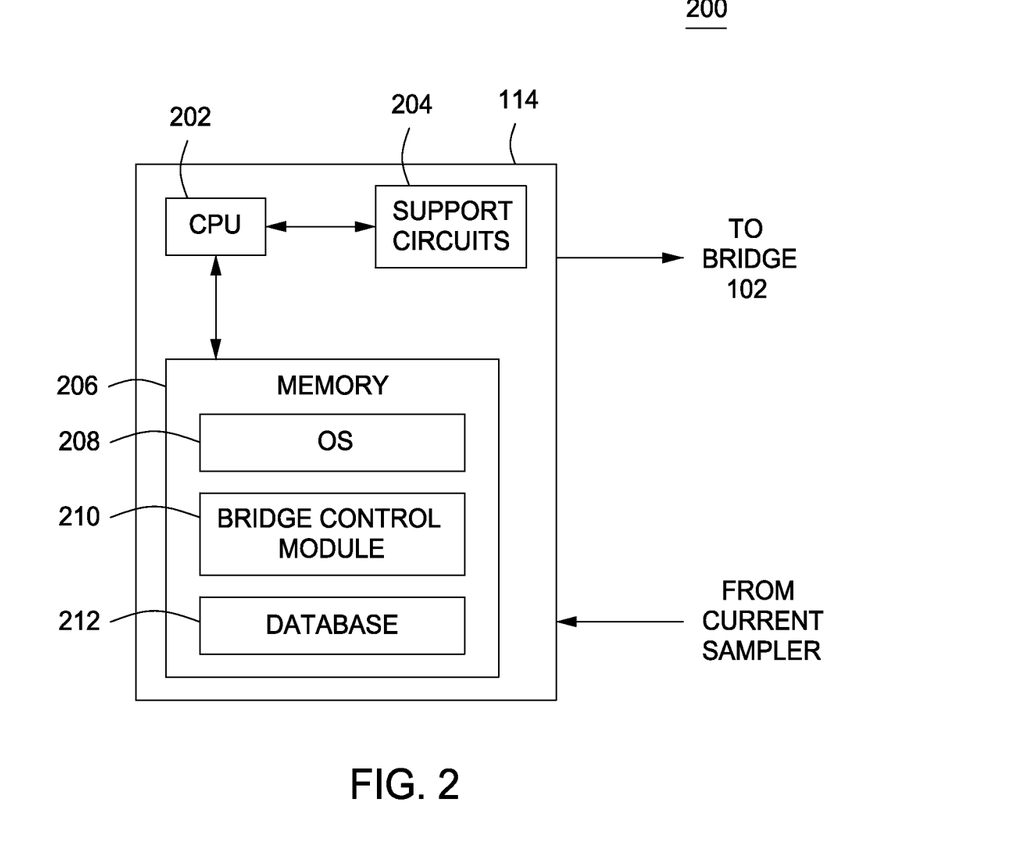
FIG. 2 is a block diagram of a bridge controller in accordance with one or more embodiments of the present invention.

FIG. 2 is a block diagram of a bridge controller 114 in accordance with one or more embodiments of the present invention. The bridge controller 114 comprises support circuits 204 and a memory 206, each coupled to a central processing unit (CPU) 202. The CPU 202 may comprise one or more conventionally available microprocessors or microcontrollers; alternatively, the CPU 202 may include one or more application specific integrated circuits (ASICs). The support circuits 204 are well known circuits used to promote functionality of the CPU 202. Such circuits include, but are not limited to, a cache, power supplies, clock circuits, buses, input/output (I/O) circuits, and the like. The bridge controller 114 may be implemented using a general purpose computer that, when executing particular software, becomes a specific purpose computer for performing various embodiments of the present invention.

The memory 206 may comprise random access memory, read only memory, removable disk memory, flash memory, and various combinations of these types of memory. The memory 206 is sometimes referred to as main memory and may, in part, be used as cache memory or buffer memory. The memory 206 generally stores the operating system (OS) 208, if necessary, of the bridge controller 114 that can be supported by the CPU capabilities. In some embodiments, the OS 208 may be one of a number of commercially available operating systems such as, but not limited to, LINUX, Real-Time Operating System (RTOS), and the like.

The memory 206 may store various forms of application software, such as a bridge control module 210 for controlling operation of the bridge 102 and performing functions related to the present invention. For example, the bridge controller 114 executes the bridge control module 210 to adjust the bridge switching frequency above or below a nominal 100 kHz frequency based on output power requirements, to compute a voltage ratio of Vin/Vout, to compare the voltage ratio to a threshold, and to operate the bridge 102 as a half H-bridge or full H-bridge based on whether the voltage ratio satisfies the threshold. For embodiments where a PV module is coupled at the input of the resonant converter 100, the bridge control module 210 may determine an operating point for biasing the PV module at its MPP and tune the switching frequency of the bridge 102 accordingly to achieve MPP operation. Further detail on the functionality provided by the bridge controller 114 is described below with respect to FIG. 3.

The memory 206 may additionally store a database 212 for storing data related to the operation of the resonant converter 100 and/or the present invention, such as one or more thresholds for comparison to the voltage ratio Vin/Vout.

In other embodiments, the CPU 202 may be a microcontroller comprising internal memory for storing controller firmware that, when executed, provides the controller functionality described below with respect to FIG. 3.

Figure 3:
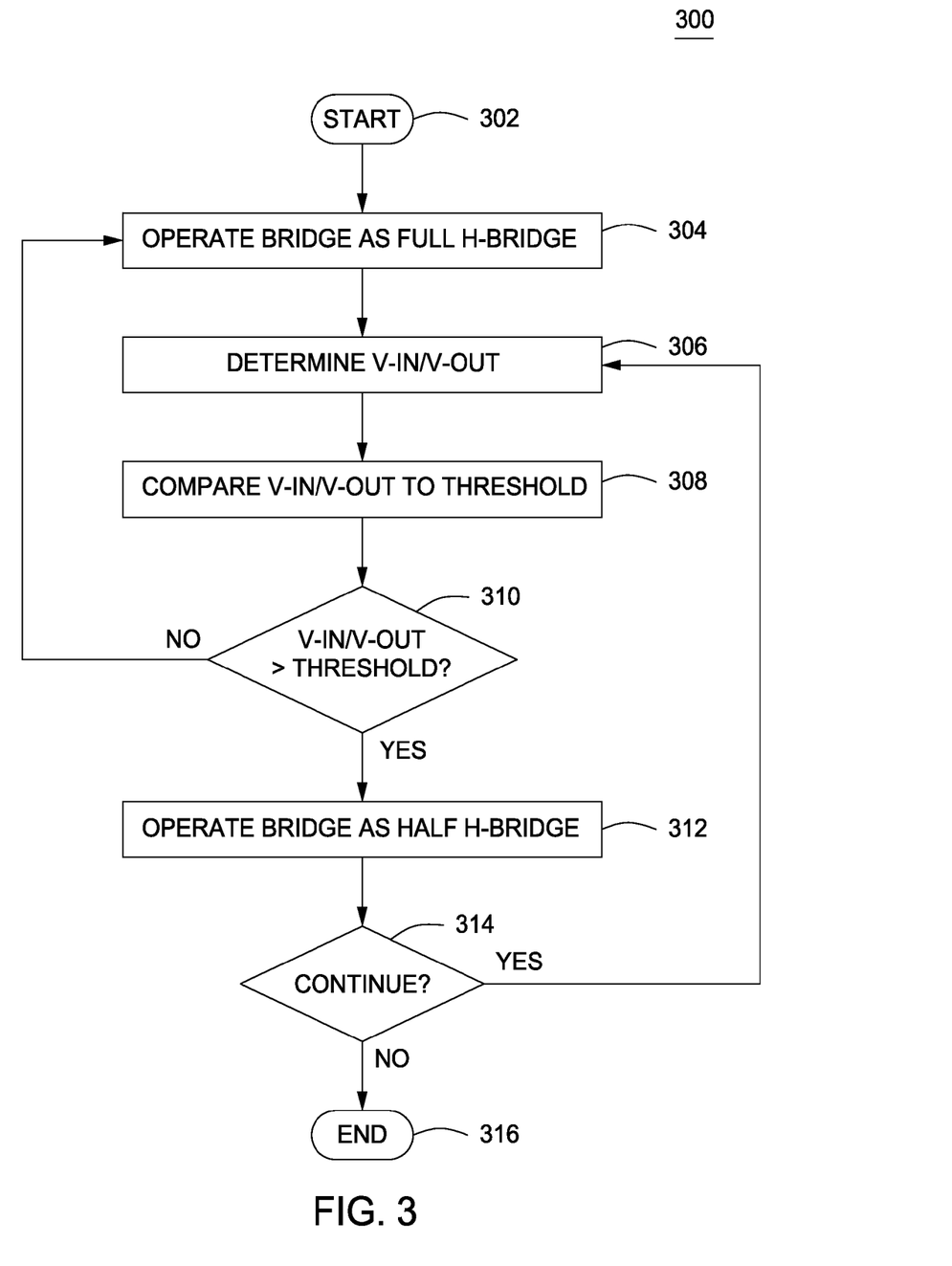
FIG. 3 is a flow diagram of a method for modulating output power from a resonant power converter in accordance with one or more embodiments of the present invention.

FIG. 3 is a flow diagram of a method 300 for modulating output power from a resonant power converter in accordance with one or more embodiments of the present invention. The method 300 is an implementation of the bridge controller 114.

The resonant converter is a DC-DC converter that comprises a full H-bridge at its input (e.g., the resonant converter 100 comprising the bridge 102). The resonant converter may comprise any type of resonant circuit, e.g., series LC, parallel LC, series-parallel LLC, series-parallel LCC, series-parallel LLCC, or the like. In some embodiments, the resonant converter is coupled to one or more renewable energy sources, such as PV modules, wind farms, hydroelectric systems, or the like, for receiving a DC input voltage. Additionally or alternatively, the resonant converter may be coupled to one or more other sources of DC power, such as a battery.

In one or more alternative embodiments, the resonant converter may comprise an AC switching stage coupled to the DC output terminals for converting the generated DC output to an AC output. Energy generated by the resonant converter may be used by one or more appliances and/or may be stored for later use, for example, utilizing batteries, heated water, hydro pumping, $H_2O$-to-hydrogen conversion, or the like.

The method 300 begins at step 302 and proceeds to step 304. At step 304, the resonant converter bridge is operated (e.g., driven by a bridge controller, such as the bridge controller 114) as a full H-bridge at a frequency proximate the resonant frequency of the resonant circuit (e.g., 100 KHz) to convert a DC input voltage Vin to a DC output voltage Vout based on output power requirements. In some embodiments, the resonant converter may be coupled to a PV module for receiving the input voltage Vin, and the resonant converter bridge may be operated at a frequency such that the PV module is biased at an MPP. For example, a bridge controller, such as the bridge controller 114, may determine the appropriate operating frequency for achieving the MPP and operate the bridge accordingly.

The method 300 proceeds to step 306, where a voltage ratio of Vin/Vout is determined. The resonant converter may comprise voltage samplers for sampling the input and output voltages (e.g., input voltage sampler 124, output voltage sampler 126) and generating values indicative of the sampled voltages ("voltage samples"). In some embodiments, the input voltage sampler and the output voltage sampler may perform such sampling at rates of 1 kHz and 50 kHz, respectively. The voltage samples may then be used to compute, for example at the bridge controller, the voltage ratio Vin/Vout.

The method 300 proceeds to step 308 where the computed voltage ratio Vin/Vout is compared to a threshold, for example by the bridge controller. In some embodiments, the voltage ratio may be determined and compared to the threshold at the same rate as the output voltage sampler samples the output voltage (e.g., 50 kHz). At step 310, a determination is made whether the voltage ratio Vin/Vout exceeds the threshold. If the voltage ratio Vin/Vout does not exceed the threshold, the method 300 returns to step 304. If the voltage ratio Vin/Vout does exceed the threshold, the method 300 proceeds to step 312.

At step 312, the bridge is operated as a half H-bridge rather than a full H-bridge. For example, one switch of the H-bridge (e.g., switch 122-1) may be continuously deactivated which another switch of the H-bridge (e.g., switch 120-2) is continuously activated and the remaining switches (e.g., switches 120-1 and 122-2) are synchronously operated 180° out of phase. Such operation reduces the bridge output voltage by half without requiring changes to the operating frequency of the bridge.

In some embodiments, one or more capacitors within the resonant circuit of the converter may be charged in a controlled manner when switching between full H-bridge and half H-bridge operation in order to reduce transient effects. For example, when operating in a full H-bridge mode, the capacitor 118 within the resonant circuit 104 may have an average quasi-zero value. When switching from full H-bridge to half H-bridge operation, the capacitor 118 may then be charged in a controlled manner to a value of Vin to reduce any transient affects from switching to the half H-bridge operation. This may be done by modulating the duty cycle of the bridge (thereby effectively modulating the DC bias voltage) in order to dampen the transient oscillation of bias voltage. For example, during full H-bridge operation, the capacitor 118 may have an average quasi-zero value, and the capacitor 118 may then be charged in a controlled manner to a value of Vin when the bridge operation is switched to half H-bridge operation. Such control may be done during the transition between full H-bridge and half H-bridge operation; additionally and/or alternatively, the pulse widths may be modulated prior to and/or after the actual mode change The method 300 proceeds to step 314, where a decision is made whether to continue operating the resonant converter. If, at step 314, it is decided to continue operation, the method 300 returns to step 306. If, at step 314, it is decided that operation will not continue, the method 300 proceeds to step 316 where it ends.

Figure 4:
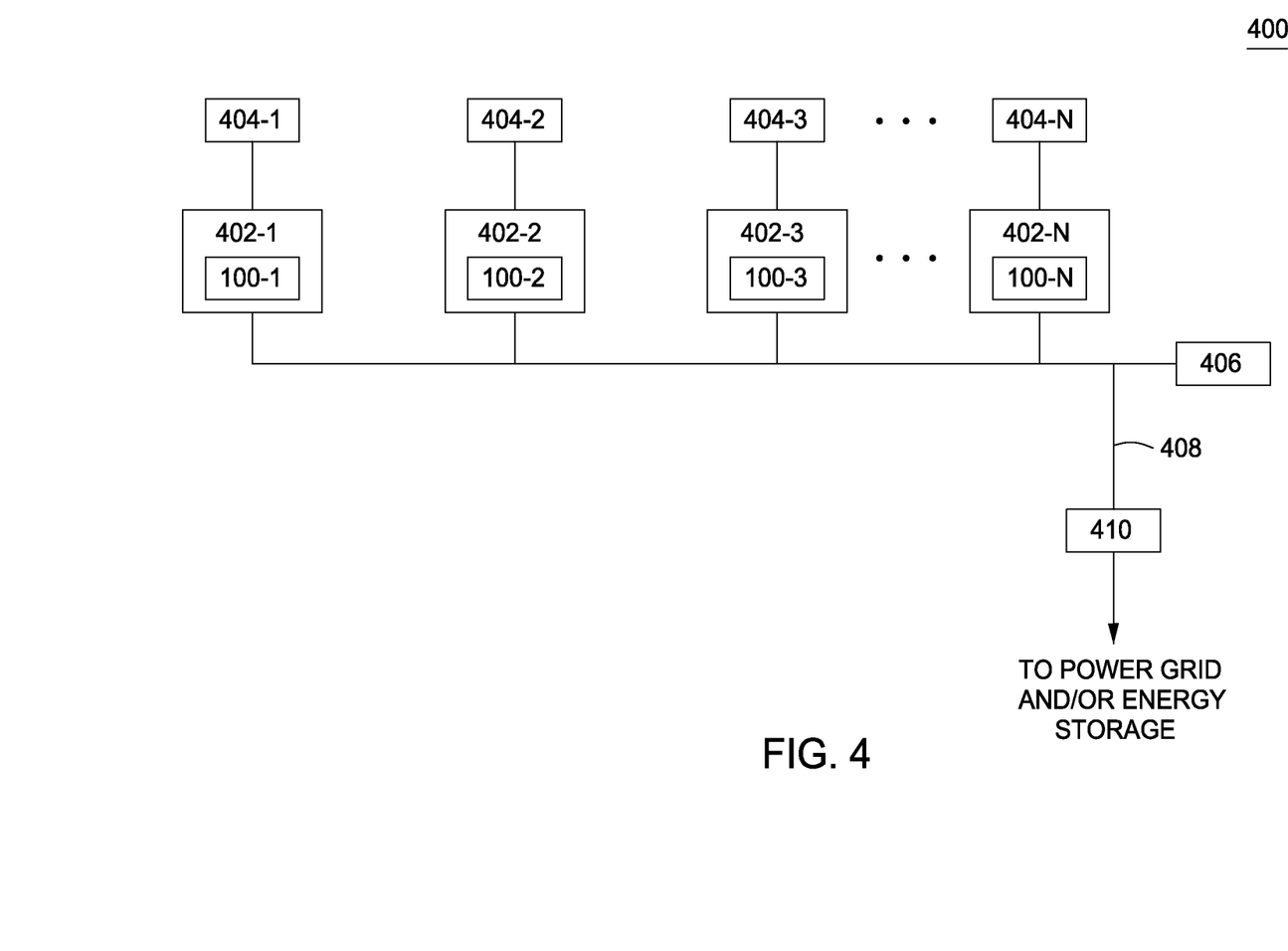
FIG. 4 is a block diagram of a system for power conversion using one or more embodiments of the present invention.

FIG. 4 is a block diagram of a system 400 for power conversion using one or more embodiments of the present invention. This diagram only portrays one variation of the myriad of possible system configurations and devices that may utilize the present invention. The present invention can be utilized in any system or device requiring a resonant converter for converting a first DC power to a second DC power, such as a DC-DC converter, a DC-AC converter, or the like.

The system 300 comprises a plurality of power converters 402-1, 402-2, 402-3 . . . 402-N, collectively referred to as power converters 402; a plurality of DC power sources 404-1, 404-2, 404-3 . . . 404-N, collectively referred to as DC power sources 404; a controller 406; a bus 408; and a load center 410. The DC power sources 404 may be any suitable DC source, such as an output from a previous power conversion stage, a battery, a renewable energy source (e.g., a solar panel or photovoltaic (PV) module, a wind turbine, a hydroelectric system, or similar renewable energy source), or the like, for providing DC power.

Each power converter 402-1, 402-2, 402-3 . . . 402-N is coupled to a DC power source 404-1, 404-2, 404-3 . . . 404-N, respectively; in some alternative embodiments, multiple DC power sources 404 may be coupled to a single power converter 402. The power converters 402 are coupled to the controller 406 via the bus 408. The controller 406 is capable of communicating with the power converters 402 by wireless and/or wired communication for providing operative control of the power converters 402. The power converters 402 are further coupled to the load center 410 via the bus 408.

The power converters 402 convert the DC power from the DC power sources 404 to an output power; in some embodiments the output power may be DC output power (i.e., the power converters 402 are DC-DC converters), while in other embodiments the output power may be AC output power (i.e., the power converters 402 are DC-AC converters). The power converters 402 couple the generated output power to the load center 410 via the bus 408. The generated power may then be distributed for use, for example to one or more appliances, and/or the generated energy may be stored for later use, for example using batteries, heated water, hydro pumping, $H_2O$-to-hydrogen conversion, or the like. In some embodiments, the power converters 402 convert the DC input power to AC power that is commercial power grid compliant and couple the AC power to the commercial power grid via the load center 410.

Each of the power converters 402 comprises a resonant converter 100 (i.e., the power converters 402-1, 402-2, 402-3 . . . 402-N comprise the resonant converters 100-1, 100-2, 100-3 . . . 100-N, respectively) utilized in the conversion of the DC input power to the output power. The resonant converters 100 operate as previously described to convert a first DC power (i.e., the DC input power) to a second DC power, where the resonant converter's H-bridge is operated as either a full H-bridge or a half H-bridge based on whether a ratio of the resonant converter's input and output voltages (i.e., Vin/Vout) satisfies a threshold.

The foregoing description of embodiments of the invention comprises a number of elements, devices, circuits and/or assemblies that perform various functions as described. For example, the bridge 102 is an example of a means for generating a bipolar square wave voltage from a DC input voltage, and the bridge controller 114 is an example of a means for computing a voltage ratio pertaining to a voltage conversion in a resonant converter; comparing the voltage ratio to a threshold; and controlling, independent of switching frequency of the resonant converter, power output from the resonant converter based on whether the voltage ratio satisfies the threshold. These elements, devices, circuits, and/or assemblies are exemplary implementations of means for performing their respectively described functions.

While the foregoing is directed to embodiments of the present invention, other and further embodiments of the invention may be devised without departing from the basic scope thereof, and the scope thereof is determined by the claims that follow.

The invention claimed is:

1. A method for controlling power conversion, comprising:
   computing a voltage ratio based on an input voltage to a resonant converter and an output voltage from the resonant converter;
   comparing the voltage ratio to a threshold; and
   controlling power output from the resonant converter based on whether the voltage ratio satisfies the threshold by dynamically switching between operating a bridge of the resonant converter as a full H-bridge and operating the bridge as a half H-bridge.

2. The method of claim 1, wherein the voltage ratio is a ratio of an input voltage of the resonant converter to an output voltage of the resonant converter.

3. The method of claim 1, wherein the bridge is operated as the half H-bridge when the voltage ratio exceeds the threshold.

4. The method of claim 1, further comprising controlling, when switching the bridge between the full H-bridge and the half H-bridge, a charge of a component of a resonant circuit of the resonant converter.

5. The method of claim 4, wherein the charge is controlled by modulating a duty cycle of the bridge.

6. The method of claim 1, wherein the threshold is $(5/3)*(N1/N2)$, wherein N1 is a number of turns of a primary winding of a transformer of the resonant converter and N2 is a number of turns of a secondary winding of the transformer.

7. Apparatus for controlling power conversion, comprising:
   a bridge controller for (i) computing a voltage ratio based on an input voltage to a resonant converter and an output voltage from the resonant converter; (ii) comparing the voltage ratio to a threshold; and (iii) controlling power output from the resonant converter based on whether the voltage ratio satisfies the threshold by dynamically switching between operating a bridge of the resonant converter as a full H-bridge and operating the bridge as a half H-bridge.

8. The apparatus of claim 7, wherein the voltage ratio is a ratio of an input voltage of the resonant converter to an output voltage of the resonant converter.

9. The apparatus of claim 7, wherein the bridge is operated as the half H-bridge when the voltage ratio exceeds the threshold.

10. The apparatus of claim 7, wherein the bridge controller controls, when switching the bridge between the full H-bridge and the half H-bridge, a charge of a component of a resonant circuit of the resonant converter.

11. The apparatus of claim 10, wherein the charge is controlled by modulating a duty cycle of the bridge.

12. The apparatus of claim 7, wherein the threshold is (5/3)*(N1/N2), wherein N1 is a number of turns of a primary winding of a transformer of the resonant converter and N2 is a number of turns of a secondary winding of the transformer.

13. Apparatus for power conversion, comprising:
a resonant converter for converting an input voltage to an output voltage, wherein the resonant converter comprises (1) an H-bridge for generating a square wave voltage from the input voltage, wherein the output voltage is based on the square wave voltage; and (2) a bridge controller for (i) computing a voltage ratio of the input voltage to the output voltage; (ii) comparing the voltage ratio to a threshold; and (iii) controlling power output from the resonant converter based on whether the voltage ratio satisfies the threshold by dynamically switching between operating the H-bridge as a full H-bridge and operating the H-bridge as a half H-bridge.

14. The apparatus of claim 13, wherein the H-bridge is operated as the half H-bridge when the voltage ratio exceeds the threshold.

15. The apparatus of claim 13, wherein the bridge controller controls, when switching the H-bridge between the full H-bridge and the half H-bridge, a charge of a component of a resonant circuit of the resonant converter.

16. The apparatus of claim 15, wherein the charge is controlled by modulating a duty cycle of the H-bridge.

17. The apparatus of claim 13, further comprising a photovoltaic (PV) module, coupled to the resonant converter, for providing the input voltage.

18. The apparatus of claim 17, further comprising a DC-AC inverter, coupled to the resonant converter, for inverting the output voltage to an AC output.

* * * * *